United States Patent
Naerum et al.

(10) Patent No.: US 9,609,813 B2
(45) Date of Patent: Apr. 4, 2017

(54) METHOD OF GROWING PLANTS

(75) Inventors: Lars Naerum, Hellerup (DK); Povl Nissen, Ølstykke (DK); Erling Lennart Hansen, Virum (DK); Jean Marie Wilhelmus Cuypers, Linne (NL); Eelke Gjalt Hempenius, Deest (NL); Frank Hendrikus Janssen, Helden (NL)

(73) Assignee: ROCKWOOL INTERNATIONAL A/S (DK)

( * ) Notice: Subject to any disclaimer, the term of this patent is extended or adjusted under 35 U.S.C. 154(b) by 507 days.

(21) Appl. No.: 13/817,482

(22) PCT Filed: Aug. 31, 2011

(86) PCT No.: PCT/EP2011/065012
§ 371 (c)(1),
(2), (4) Date: Jul. 11, 2013

(87) PCT Pub. No.: WO2012/028650
PCT Pub. Date: Mar. 8, 2012

(65) Prior Publication Data
US 2013/0283688 A1    Oct. 31, 2013

(30) Foreign Application Priority Data
Aug. 31, 2010   (EP) .................................... 10174762

(51) Int. Cl.
*A01G 31/00* (2006.01)
*A01H 4/00* (2006.01)

(52) U.S. Cl.
CPC ........... *A01G 31/001* (2013.01); *A01H 4/001* (2013.01); *A01G 2031/005* (2013.01); *Y02P 60/216* (2015.11)

(58) Field of Classification Search
CPC ............... A01G 9/1013; A01G 31/001; A01G 2031/005
USPC ............................................ 47/59 S, 58.1 R
See application file for complete search history.

(56) References Cited

U.S. PATENT DOCUMENTS

| | | | |
|---|---|---|---|
| 4,777,763 A * | 10/1988 | Shannon et al. | 47/74 |
| 7,104,006 B1 * | 9/2006 | Blaakmeer et al. | 47/59 S |
| 8,544,207 B2 * | 10/2013 | King et al. | 47/59 S |
| 2005/0148479 A1 * | 7/2005 | Barthel et al. | 510/101 |
| 2005/0215153 A1 | 9/2005 | Cossement et al. | |
| 2006/0130702 A1 * | 6/2006 | Bockmuehl et al. | 106/123.11 |
| 2006/0134239 A1 * | 6/2006 | Weide et al. | 424/745 |
| 2007/0009561 A1 * | 1/2007 | Holderbaum et al. | 424/401 |
| 2007/0027283 A1 * | 2/2007 | Swift et al. | 527/312 |
| 2008/0009209 A1 * | 1/2008 | Clamen et al. | 442/59 |
| 2010/0058661 A1 * | 3/2010 | Jackson et al. | 47/59 S |
| 2010/0282996 A1 * | 11/2010 | Jaffrennou et al. | 252/8.83 |
| 2011/0210280 A1 * | 9/2011 | Jaffrennou | 252/62 |
| 2013/0140481 A1 * | 6/2013 | Naerum | C03C 25/26 252/62 |
| 2014/0182199 A1 * | 7/2014 | Hempenius | A01G 31/001 47/56 |

FOREIGN PATENT DOCUMENTS

| | | |
|---|---|---|
| DE | 4024727 | 2/1992 |
| DE | 4208733 | 9/1993 |
| EP | 1366426 | 11/1973 |
| EP | 0310501 | 4/1989 |
| EP | 0631466 | 9/1993 |
| EP | 0889175 | 1/1999 |
| EP | 1521807 | 1/2004 |
| EP | 1897433 | 3/2008 |
| EP | 1961291 | 8/2008 |
| WO | 9204824 | 4/1992 |
| WO | 9936368 | 7/1999 |
| WO | 0105725 | 1/2001 |
| WO | 0206178 | 1/2002 |
| WO | 2004007615 | 1/2004 |
| WO | 2006061249 | 6/2006 |
| WO | 2007129202 | 11/2007 |
| WO | 2008009460 | 1/2008 |
| WO | 2008009462 | 1/2008 |
| WO | 2008009463 | 1/2008 |
| WO | 2008009465 | 1/2008 |
| WO | 2008009467 | 1/2008 |
| WO | 2008020069 | 2/2008 |
| WO | 2008020073 | 2/2008 |
| WO | 2008023032 | 2/2008 |
| WO | 2008028923 | 3/2008 |
| WO | 2008089849 | 7/2008 |
| WO | 2009019232 | 2/2009 |
| WO | 2010003677 | 1/2010 |
| WO | 2010106181 | 9/2010 |

\* cited by examiner

*Primary Examiner* — Kathleen Alker
(74) *Attorney, Agent, or Firm* — Tarolli, Sundheim, Covell & Tummino LLP

(57) ABSTRACT

The invention provides a method of growing plants in a mineral wool growth substrate, the method comprising:
  providing at least one mineral wool growth substrate comprising man-made vitreous fibers bonded with a cured binder composition, and
  positioning one or more seeds or plants for growth in the growth substrate, and allowing growth of the one or more plants,
wherein the binder composition prior to curing comprises:
  a) a sugar component, and
  b) a reaction product of a polycarboxylic acid component and an alkanolamine component,
wherein the binder composition prior to curing contains at least 42% by weight of the sugar component based on the total weight (dry matter) of the binder components.

8 Claims, No Drawings

METHOD OF GROWING PLANTS

FIELD OF THE INVENTION

This invention relates to methods of growing plants using a mineral wool growth substrate. In the method, the mineral wool growth substrate comprises a binder, to provide structural integrity. Usually a wetting agent is also provided which provides improved water handling characteristics.

BACKGROUND OF THE INVENTION

It has been well known for many years to grow plants in growth substrates formed from mineral wool. Mineral wool products which are provided as a coherent block, plug, slab or mat/blanket generally include a binder, usually an organic binder, in order to provide structural integrity to the product, and such binders are commonly hydrophobic once cured. This allows the growth substrate to retain its structure during water irrigation, including use for over one year. However mineral wool products which are to be used as growth substrates also need to have the capacity to take up and hold the water which is routinely supplied by an irrigation system to the growth substrate, and re-wetting properties. Accordingly, it has been well known for some years to include a wetting agent in mineral wool products which are to be used as growth substrates.

It is important in commercial growing that the growth substrate used enables the plants to grow both rapidly and all at substantially the same rate so that when the grower reviews the plants, the greater proportion are in the most desired category. It is especially important that plants within one category are as uniform as possible so that there is less variation between the plants in the category.

One early example of a mineral wool product which can be used as a growth substrate is given by GB-A-1336426, which describes readily wettable mineral wool products suitable for use as growth substrates. To provide structure and shape, the fibres contain a binder such as a phenyl formaldehyde resin, or urea formaldehyde resin. To provide the required water-holding characteristics the product also contains a wetting agent, in an amount of up to 2% by weight based on the mineral wool. General classes of wetting agents are mentioned, such as anionic and cationic wetting agents, but non-ionic wetting agents are said to be preferred. Examples are alkyl polyglycol ethers, such as Triton CF10 and Lissapol N.

Publications, and the commercial field itself, have generally followed this approach for many years. For instance, EP-A-889175, DE-A-4208733, WO92/04824 and DE-A-4024727 all describe systems in which a wetting agent/surfactant is included in the mineral wool growth substrate, and in which the mineral wool binder is generally hydrophobic.

WO2008/009467, WO2008/009462, WO2008/009463 and WO2008/009465 all disclose the use of an ionic surfactant as a wetting agent. WO2008/009460 discloses the use of an anionic surfactant as a wetting agent. These documents disclose the use of a phenol urea formaldehyde resin as binder in conjunction with these ionic surfactants. Such a system is also used commercially.

Other types of binder than the standard phenol urea formaldehyde type have been disclosed for use in mineral wool growth substrates.

For instance, it is known to use sugar components in binder compositions used in mineral fibre growth substrates for use in growing plants. For example, WO2008/089849 discloses a mineral fibre product for hydroponic applications having a low-phenol or phenol-free binder. The binder is based on reaction products obtained by curing an aqueous solution comprising citric acid, ammonia and dextrose.

EP0631466 discloses a cultivating medium for plants consisting of bonded mineral wool, in particular rock wool, characterised in that a polysaccharide which is insoluble in cold water is provided and made to adhere to at least part of the surface of said mineral wool.

WO07129202 discloses a hydrophilic curable aqueous composition for use in a plant growth substrate wherein said curable aqueous composition is formed in a process comprising combining the following components:
a hydroxy-containing polymer,
a multi-functional crosslinking agent which is at least one selected from the group consisting of a polyacid, salt(s) thereof and an anhydride, and
a hydrophilic modifier; wherein the ratio of (a):(b) is from 95:5 to about 35:65.

The hydrophilic modifier can be a sugar alcohol, monosaccharide, disaccharide or oligosaccharide. Examples given include glycerol, sorbitol, glucose, fructose, sucrose, maltose, lactose, glucose syrup and fructose syrup.

It is has been disclosed to use sugar components in binder compositions used in mineral wool products other than those for use as growth substrates. This is shown in WO2009/019232 which discloses the manufacture of a mineral fibre thermal insulation product wherein the binder solution comprises a reducing sugar and an acid precursor derivable from an inorganic salt and a source of nitrogen.

In the field of plant growth substrates, it has also been disclosed to create a hydrophilic binder, in order to improve the water retention properties of the binder. An example of this is EP1961291. This document discloses a method for producing water-absorbing fibre products by interconnecting fibres using a self-curing phenolic resin and under the action of a wetting agent, characterised in that a binder solution containing a self-curing phenolic resin and polyalcohol is used. It is known in the art therefore to create more hydrophilic binders using a wetting agent.

It is has been disclosed to choose a hydrophilic binder system for use in agriculture and horticulture, for instance, as a plant growth substrate. This is shown in WO2008/020073.

Whilst such systems are effective generally, there is room for improvement of the growth substrate product in various respects. It would be desirable to provide systems which show water handling capabilities, such as: improved re-saturation properties (ability of the growth substrate to take up water a second time once it has been wetted and then dried); improved water distribution properties (ability of the growth substrate to hold water at a more uniform concentration throughout the height and the volume of the growth substrate rather than concentrating at the base); and water retention. It would be desirable to provide systems which show improved seed retention and propagation, rooting-in and plant growth with a higher proportion of plants in the required selection category and with the highest uniformity between the plants.

SUMMARY OF THE INVENTION

In the first aspect of the invention, we provide a method of growing plants in a mineral wool growth substrate, the method comprising: providing at least one mineral wool growth substrate comprising man-made vitreous fibres bonded with a cured binder composition, and positioning one or more seeds or plants for growth in the growth substrate, and allowing growth of the one or more plants, wherein the binder composition prior to curing comprises: a) a sugar component, and b) a reaction product of a polycarboxylic acid component and an alkanolamine component, wherein the binder composition prior to curing contains at least 42% by weight of the sugar component based on the total weight (dry matter) of the binder components.

In a second aspect of the invention, we provide the use of a mineral fibre product as a substrate for growing plants, the mineral fibre product comprising man-made vitreous fibres bonded with a cured binder composition, wherein the binder composition prior to curing comprises: a) a sugar component, and b) a reaction product of a polycarboxylic acid component and an alkanolamine component, wherein the binder composition prior to curing contains at least 42% by weight of the sugar component based on the total weight (dry matter) of the binder components.

In a third aspect of the invention, we provide a mineral fibre product comprising man-made vitreous fibres (MMVF) bonded with a cured binder composition, wherein the binder composition prior to curing comprises: a) a sugar component, b) a reaction product of a polycarboxylic acid component and an alkanolamine component, wherein the binder prior to curing contains at least 42% by weight of the sugar component based on the total weight (dry matter) of the binder components, and wherein the mineral fibre product also comprises c) a wetting agent.

In a fourth aspect of the invention, we provide a method of making a mineral fibre product comprising the steps of: (i) providing MMVF; (ii) spraying the MMVF with a binder composition; (iii) spraying the MMVF with a wetting agent; (iv) collecting and consolidating the MMVF; and (v) curing the binder composition; wherein the uncured binder composition comprises: a) a sugar component, and b) a reaction product of a polycarboxylic acid component and an alkanolamine component, wherein the uncured binder composition contains at least 42% by weight of the sugar component based on the total weight (dry matter) of the binder components.

In a fifth aspect of the invention, we provide the use of the mineral fibre product produced by the method of the fourth aspect of the invention for growing plants.

In a sixth aspect of the invention, we provide a composition comprising: a) a sugar component; b) a reaction product of a polycarboxylic acid component and an alkanolamine component, and wherein the composition contains at least 42% by weight of the sugar component, based on the total weight (dry matter) of the binder components, and wherein the composition also comprises c) a wetting agent.

In our unpublished PCT Application, PCT/EP2010/053645, we describe an aqueous binder composition comprising a sugar syrup containing a reducing sugar and having a dextrose equivalent DE of at least 50 and less than 85;
a carboxylic acid component;
an amine component; and optionally,
a reaction product of the carboxylic acid component (b) and an amine component (c). This binder in PCT/EP2010/053645 is not disclosed for use in a mineral wool growth substrate for growing plants.

The present invention results in numerous advantages.

One advantage of the present invention is that the mineral fibre product of the present invention has improved water handling properties, in particular a higher re-saturation value and higher WC-10 (measure of water retention) than other commercially-used mineral fibre products suitable for growth substrates. This is the case for the mineral wool fibre product when used in the form of plugs and blocks.

The use of the mineral fibre product as a growth substrate of the present invention results in improved growth results—for instance it increases the number of reusable transplants when compared to other widely commercially-used growth substrates.

It has been observed that the use of a mineral fibre product of the present invention as a growth substrate leads to improved efficiency of positioning of seeds in seed holes for propagation (it appears that fewer seeds "bounce out" of the seed holes during the automated positioning process) than in presently widely-used growth substrates. This greater accuracy of positioning of seeds in the present invention results in the grower having to spend less time repositioning seeds and fewer seeds are lost due to inaccurate positioning in the seed hole. It also results in greater uniformity of environment across the set of seeds being grown, leading to greater uniformity of the end-product plants.

The use of growth substrates of the present invention led to generally improved plant quality.

For instance the use of the mineral wool substrate of the present invention resulted in more plants in category A selected using a vision system selection machine than the prior art. Category A plants are the best quality plants that can be used immediately for sales or for further use in blocks or for grafting. The use of the mineral wool substrate of the present invention resulted in more plants in category A and B combined as selected using a vision system selection machine than the prior art. Class B needs to be grown further (for one or two days) to reach class A quality.

An advantage of the present invention is therefore that more of the plants grown in the growth substrate are in category A, and category A and B combined when compared to the prior art.

Especially when used for propagation, the rooting-in, plant growth, fresh weight and dry weight and length of the plant and leaf area are all increased by using the growth substrate of the present invention compared to the prior art.

Another way in which plant quality is demonstrated is by the presence of fewer yellow leaves forming on the plants grown in the substrate of the present invention in comparison with the prior art. Often, there are no yellow leaves.

The strength of the mineral wool fibre product is increased at the same value of loss on ignition (i.e. at the same level of binder plus wetting agent, if used) as the prior art. The increased compression strength is very valuable as it means that the product is less likely to be damaged during use. This is particularly important in modern growing environments where much of the processing is automated—for instance seeding and selection both involve the use of machinery, including clamps, which can subject the growth substrate to significant pressure/force.

A further advantage is that a smoother seed bed/hole can be formed in the product. This results in improved growth. It is also believed to contribute to the effect discussed above of improved efficiency of positioning of seeds.

The inclusion of a high proportion of the sugar component in the binder composition is especially useful in the context of use for growth substrates. The presence of the sugar tends to result in a browning on curing. This browning is advantageous for mineral wool growth substrates as it makes it easier for the grower to check the position of light coloured seeds in the mineral wool growth substrate. Additionally, a brown coloured mineral wool growth substrate is desirable for the end users as it has a closer resemblance to soil than light coloured mineral wool growth substrates. At the same time the inclusion of sugar results in a binder that is more economical to produce, and more environmentally friendly, than one containing primarily the component (b) but without detrimental effects on the plant growth.

It is also found that the quality of the binder combination of the invention is improved relative to products having low or no sugar component content, as the ageing properties and fire resistance properties are better.

In the present invention a binder composition is used which contains components (a) and (b) as defined above. This composition is included in the product which is to be for use as a growth substrate and then cured, so that in the final product as used as a growth substrate the composition has been cured and so the components will have reacted. Thus the final product used as a growth substrate contains a cured binder obtained by curing of the defined binder composition containing components (a) and (b) and the components of the binder composition discussed below refer to the composition prior to curing.

The sugar component (a) employed in accordance with the present invention is preferably selected from sucrose and reducing sugars or mixtures thereof.

A reducing sugar is any sugar that, in solution, has an aldehyde or a ketone group which allows the sugar to act as a reducing agent. In accordance with the present invention, reducing sugars may be present in the uncured binder composition as such or as a carbohydrate compound that yields one or more reducing sugars in situ under thermal curing conditions. The sugar or carbohydrate compound may be monosaccharide in its aldose or ketose form, a disaccharide, a triose, a tetrose, a pentose, a hexose, or a heptose; or a di-, oligo-or polysaccharide; or combinations thereof. Specific examples are glucose (i.e. dextrose), starch hydrolysates such as corn syrup, arabinose, xylose, ribose, galactose, mannose, frustose, maltose, lactose and invert sugar.

Crystalline dextrose is normally produced by subjecting an aqueous slurry of starch to hydrolysis by means of heat, acid or enzymes. Depending on the reaction conditions employed in the hydrolysis of starch, a variety of mixtures of glucose and intermediates is obtained which may be characterized by their DE number. DE is an abbreviation for Dextrose Equivalent and is defined as the content of reducing sugars, expressed as the number of grams of anhydrous D-glucose per 100 g of the dry matter in the sample, when determined by the method specified in International Standard ISO 5377-1981 (E). This method measures reducing end groups and attaches a DE of 100 to pure glucose (=dextrose) and a DE of 0 to pure starch.

Only glucose syrup of high DE can crystallize easily and yield a product in powder or granular form. A most popular crystallised product is dextrose monohydrate with application in medicine and chewing tablets. Dextrose monohydrate is pure glucose (DE 100).

With lower DE numbers, the syrup gradually loses its tendency to crystallise. Below approximately 45 DE, the syrup can be concentrated into a stable, non-crystallising liquid, for instance, Standard 42 DE syrup which finds wide spread use in canned fruit preserves, ice cream, bakery products, jam, candy, and all kinds of confectionery.

A preferred sugar component for use in the present invention is a reducing sugar having a dextrose equivalent DE of 40 to 100, preferably 50 to 100, and more preferably 86 to 100. Particularly preferred reducing sugar components are high DE glucose syrup, high-fructose syrup and mixtures thereof, for example dextrose sugar syrup Sirodex 331 or Sirodex 431, both from Syral.

However, one advantage of the invention is that it is also possible to use sugar components having relatively low DE (e.g. between 45 and 55), when sucrose is used as the sugar component, which can be more economical.

The viscosity and the content of large polymers in a sugar syrup generally may decrease with an increasing DE value. A large content of polymers should preferably be avoided for a mineral wool binder because this will provide a more sticky binder resulting in stickiness of the formed mineral wool mat or binder-containing web to the manufacturing equipment such as e.g. the forming chamber walls, the travelling conveyors, rollers and pendulums.

The solubility of the binder solution containing a sugar syrup may increase with increasing DE value. The binder solution should be sufficiently water soluble to provide a homogenous distribution of the binder on the mineral fibres making up the mineral wool mat or web to be cured.

The quality of the binder is improved when a sugar component with a high DE number such as 40 to 100 is used. The solubility of the binder solution will increase with increased DE number of the sugar component. The binder solution must be sufficiently water soluble to provide a homogenous distribution on the fibres when making a growth substrate product to be cured.

A sugar syrup will generally result in a browning on curing which is more pronounced with increasing DE value. This browning is advantageous for mineral wool growth substrates as it is easier to check the position of light coloured seeds in the mineral wool growth substrate. Additionally, a brown coloured mineral wool growth substrate is desirable for the end users as it has a closer resemblance to soil than light coloured mineral wool growth substrates.

The sugar component is present in the uncured binder composition in an amount of at least 42% by weight based on the total weight (dry matter) of the binder components. The sugar component may be present in the uncured binder composition in an amount of 42-90% by weight based on the total weight (dry matter) of the binder components, preferably 42-75% by weight, more preferably 45-55% by weight. It can be at least 50% by weight and in some cases amounts of at least 60% are beneficial.

Component (b) essentially comprises a reaction product of a polycarboxylic acid component and an alkanolamine component.

Preferably the alkanolamine component is selected from diethanolamine, triethanolamine, diisopropanolamine, triisopropanolamine, methyldiethanolamine, ethyldiethanolamine, n-butyldiethanolamine, methyldiisopropanolamine, ethyl-isopropanolamine, ethyldiisopropanolamine, 3-amino-1,2-propanediol, 2-amino-1,3-propanediol and tris(hydroxymethyl)aminomethane. Most preferably the alkanolamine component is diethanolamine.

In the binder composition which is used in the products of the invention it is essential to have the reaction product (b). However, in practice there is usually also some unreacted alkanolamine component present in the uncured binder composition.

The polycarboxylic acid component is generally selected from dicarboxylic, tricarboxylic, tetracarboxylic, pentacarboxylic, and like polycarboxylic acids, and anhydrides, salts and combinations thereof.

Preferred polycarboxylic acid components employed as starting materials for reacting with the other binder components are carboxylic anhydrides.

The preferred carboxylic anhydride component may be selected from saturated or unsaturated aliphatic and cycloaliphatic anhydrides, aromatic anhydrides and mixtures thereof, preferably saturated or unsaturated cycloaliphatic anhydrides, aromatic anhydrides and mixtures thereof.

In a particularly preferred embodiment of the invention, two different anhydrides selected from cycloaliphatic and/or aromatic anhydrides are employed. Preferably these different anhydrides are reacted in sequence.

Preferably the carboxylic anhydride component comprises a combination of cycloaliphatic and aromatic anhydride. Preferably the carboxylic anhydride is selected from tetrahydrophthalic anhydride, hexahydrophthalic anhydride, methyltetrahydrophthalic anhydride, and nadic anhydride. Preferably the aromatic anhydride is selected from phthalic anhydride, methylphthalic anhydride, trimellitic anhydride and pyromellitic anhydride.

In the above embodiment employing two different anhydrides, a combination of cycloaliphatic anhydride and aromatic anhydride is particularly preferred, e.g., a combination of tetrahydrophthalic anhydride (THPA) and trimellitic anhydride (TMA). The molar ratio of cycloaliphatic anhydride to aromatic anhydride is preferably within the range of from 0.1 to 10, more preferably within the range of from 0.5 to 3.

In the binder composition which is used in the products of the invention it is essential to have the reaction product (b). However, in practice there is usually also some unreacted polycarboxylic acid component present in the uncured binder composition.

In the preparation of component (b), the proportion of the alkanolamine and carboxylic anhydride reactants is preferably selected such that the ratio of equivalents of amine plus hydroxy groups (NH+OH) to equivalents of carboxy groups (COOH) is at least 0.4, more preferably at least 0.6.

On the other hand, the properties of the final binder composition, such as curing behaviour, are determined by the total ratio of reactive groups present. Therefore, for optimum performance, the ratio of equivalents of amine plus hydroxy groups (NH+OH) to equivalents of carboxy groups (COOH) in the final binder composition is preferably adjusted to 2.0 or less, more preferably to 1.7 or less. In general, the final binder composition has an equivalent ratio of (NH+OH)/(COOH) within the range of from 1.25 to 1.55.

The reaction between the alkanolamine and carboxylic anhydride reactants is carried out in known manner, for instance, as described in WO99/36368, WO01/05725, WO02/06178, WO2004/007615 and WO2006/061249, the entire contents of which documents are incorporated herein by reference.

WO06/061249, WO08/020069, WO08/023032 and WO08/028923 all disclose a binder composition which comprises a reaction product of a alkanolamine and a carboxylic anhydride. These publications also disclose the use of carbohydrates in binder compositions. The carbohydrate used in a binder composition is described as a "co-binder" and this component is intended to accelerate curing. These documents do not disclose the use of sugar as a co-binder/curing accelerator or as a major component of the binding component itself. There is a very general disclosure in each of these documents of a long list of possible uses of the mineral fibre products, including use as horticultural growing media, but this is not exemplified in any way.

EP1521807 discloses the use of reactants of alkanolamine and carboxylic anhydride reaction products with glucose as a part of the binder. There is a very general disclosure of use of a mineral fibre product as horticultural growing media. This is not exemplified in any way.

If appropriate, an additional acid monomer may be employed in the reaction and is preferably added to the reaction mixture before addition of the anhydride reactant. Specific examples of suitable acid monomers are di-, tri- and polycarboxylic acids such as adipic acid, citric acid, sebacic acid, succinic acid, tartaric acid and trimellitic acid.

The reaction temperature is generally within the range from 50° C. to 200° C. In a preferred embodiment, and in particular when two different anhydrides are employed, the alkanolamine is first heated to a temperature of at least about 40° C., preferably at least about 60° C., whereafter the first anhydride is added and the reaction temperature is raised to at least about 70° C., preferably at least about 95° C. and more preferably at least about 125° C., at which temperature the second anhydride is added to the reaction mixture when substantially all the first anhydride has dissolved and/or reacted. Increasing the reaction temperature from 70-95° C. to 100-200° C. allows a higher conversion of monomers to oligomers. In this case, a preferred temperature range is 105-170° C., more preferably 110-150° C.

If water is added after the first anhydride has reacted, either together with the second anhydride or before addition of the second anhydride or at the end of the reaction, in an amount to make the binder easily pumpable, a binder having an increased molecular weight (compared to water addition from the start) is obtained which still has a desired pumpability, viscosity, and water dilutability and contains less unreacted monomers.

In order to improve the water solubility and dilutability of the binder, a base may be added up to a pH of about 8, preferably a pH of between about 5-8, and more preferably a pH of about 6. Furthermore, the addition of a base will cause at least partial neutralisation of unreacted acids and a concomitant reduction of corrosiveness. Normally, the base will be added in an amount sufficient to achieve the desired water solubility or dilutability. The base is preferably selected from volatile bases which will evaporate at or below curing temperature and hence will not influence curing. Specific examples of suitable bases are ammonia ($NH_3$) and organic amines such as diethanolamine (DE-A) and triethanolamine (TEA). The base is preferably added to the reaction mixture after the reaction between the alkanolamine and the carboxylic anhydride has been active stopped by adding water.

The growth substrate product preferably comprises a wetting agent. This can be a conventional non-ionic surfactant but preferably the wetting agent is an ionic surfactant.

Preferably it is an anionic surfactant. Suitable anionic surfactants include salts (including, for example, sodium, potassium, ammonium and substituted ammonium salts such as mono-, di- and triethanolamine salts) of the anionic sulphate, sulphonate, carboxylate and sarcosinate surfactants. Other anionic surfactants include isethionates such as the acyl isethionates, N-acyl taurates, fatty acid amines of methyl tauride, alkyl succinates and sulfosuccinates, mono esters of sulfosuccinates, di-esters of sulfosuccinates and N-acyl sarcosinates. Preferred are anionic sulphate surfactants and anionic sulphonate surfactants, anionic carboxylate surfactants and anionic soap surfactants.

Particularly preferred are the anionic sulphonate surfactants such as linear or branched alkyl benzene sulphonates, alkyl ester sulphonates, primary or secondary alkylene sulphonates, olefin sulphonates, sulphonated polycarboxylic acids, alkyl glycerol sulphonates, fatty acyl glycerol sulphonates, fatty oleyl glycerol sulphonates and mixtures thereof.

Most preferably the anionic surfactant is a linear alkyl benzene sulphonate in which the alkyl chain has from 5 to 20 carbon atoms. The sodium and potassium salts are preferred. This type of surfactant provides particularly beneficial water distribution properties for growth substrates of relatively large height and also provides excellent re-saturation properties and does not lead to foaming problems in the irrigation water. Conventional non-ionic surfactants allow the growth substrate to take up water, but their water retaining capacity, water distribution over height and re-wetting properties are not as good as with this type of surfactant, preferred in the invention.

Preferably the alkyl chain length is in the range 8 to 16, and more preferably at least 90% of the chains are in the range 10 to 13 and more preferably at least 90% (by weight) are in the range 10 to 12.

Preferably the wetting agent comprises a linear alkyl benzene sulphonate and in this case the product is preferably produced by a method in which a polyol (such as monoethylene glycol) is included with the wetting agent in the mineral fibre product. The weight ratio of linear alkyl benzene sulphonate to monoethylene glycol (or other polyol—for instance propylene glycol or trimethylolpropane) is preferably 0.3:1 to 3.75:1, preferably 1:1 to 2:1. The polyol is normally evaporated during subsequent processing and curing and thus usually only trace amounts, if any, are present in the final product.

Alternatively, the ionic surfactant may be cationic or zwitterionic. Examples of cationic surfactants include quaternary ammonium surfactants. These can, for instance, be selected from mono C6 to mono C16, preferably C6 to C10 N-alkyl or alkenyl ammonium surfactants wherein the remaining N positions are substituted by groups such as methyl, hydroxyethyl and hydroxypropyl.

Suitable zwitterionic surfactants include derivatives of secondary and tertiary amines, derivatives of heterocyclic secondary and tertiary amines, or derivatives of quaternary ammonium, quaternary phosphonium or tertiary sulphonium compounds. Betaine and sultaine surfactants are examples of zwitterionic surfactants.

Preferably the amount (by weight) of ionic surfactant based on the weight of binder (dry matter) is in the range 0.01 to 5%, preferably 0.1 to 4%.

The ionic surfactant is present in the mineral fibre product in amounts preferably from 0.01 to 3% (by weight), based on mineral fibre product, more preferably 0.05 to 1%, in particular, 0.1 to 0.8%.

The binder compositions used according to the present invention may additionally comprise one or more conventional binder additives. These include, for instance, curing accelerators such as, e.g. β-hydroxyalkylamides; the free acid and salt forms of phosphoric acid, hypophosphorous acid and phosphonic acid. Other strong acids such as boric acid, sulphuric acid, nitric acid and p-toluenesulphonic acid may also be used, either alone or in combination with the just-mentioned acids, in particular with phosphoric acid, hypophosphorous acid or phosphonic acid. Other suitable binder additives are ammonia; silane coupling agents such as γ-aminopropyltriethoxysilane; thermal stabilisers; UV stabilisers; plasticisers; anti-migration aids; coalescents; fillers and extenders such as clay, silicates and magnesium hydroxide; pigments such as titanium dioxide; flame retardants; corrosion inhibitors such as thiourea, urea; antifoaming agents; antioxidants; and others.

These binder additives and adjuvants may be used in conventional amounts generally not exceeding 20 wt. % of the binder solids. The amount of curing accelerator in the binder composition is generally between 0.05 and 5 wt. %, based on solids.

The aqueous binder composition as applied to the mineral fibres generally has a solids content of from 1 to 20 wt. % and a pH of 6 or greater.

In the method of the invention the growth substrate product used may be in any of the known forms for growth substrate products, such as those usually known as plugs, blocks, slabs and mats.

In particular the invention is beneficial in the case where the product is in a form generally known for use as a substrate for the propagation stage.

Thus the mineral wool growth substrate product may have dimensions conventional for the product type commonly known as a plug. Thus it may have height from 20 to 35 mm, often 25 to 28 mm, and length and width in the range 15 to 25 mm, often around 20 mm. In this case the substrate is often substantially cylindrical with the end surfaces of the cylinder forming the top and bottom surfaces of the growth substrate. Another embodiment has height from 30 to 50 mm, often around 40 mm and length and width in the range 20 to 40 mm, often around 30 mm. The growth substrate in this case is often of cuboid form. In this first case the volume of the growth substrate is often not more than 50 $cm^3$, preferably not more than 40 $cm^3$. Alternatively the growth substrate may be of the type described as the first coherent mineral wool growth substrate in our publication WO2010/003677. In this second case the volume of the growth substrate product is most preferably in the range to 10 to 40 $cm^3$.

The height is the vertical height of the growth substrate when positioned as intended to be used.

In general, the growth substrate may be of any appropriate shape including cylindrical, cuboidal and cubic.

In general the volume of the growth substrate product is in the range 5 to 150 $cm^3$ and preferably not more than 100 $cm^3$, more preferably not more than 80 $cm^3$, in particular not more than 75 $cm^3$, most preferably not more than 70 $cm^3$.

The minimum distance between the top and bottom surfaces is preferably not more than 50 mm, more preferably less than 40 mm and in particular less than 30 mm.

In this case the product usually has a seed hole and the invention is especially beneficial in the context of products having a seed hole, to be used for growth from a seed, for reasons given above.

Alternatively the product may be in the form of a product commonly known as a block, having volume in the range 500 to 1000 $cm^3$, preferably in the range 650 to 800 $cm^3$.

In the cases of plugs and blocks and other products having volume less than 1000 $cm^3$ the product will usually also include wetting agent.

The product may be of even greater volume, for instance in the form of a slab or mat. When the volume of the product is high, for instance at least 1000 $cm^3$, in particular at least 2000 $cm^3$, then we find that, although it is possible in the invention to use a wetting agent, due to the use of the defined binder system it is possible to achieve good growth results without the addition of wetting agent. It is possible to achieve good results without the inclusion of wetting agent in growing methods where the growth substrate product is wetted before growth is begun (often before transfer of the plant to the substrate) over a period of hours—e.g. at least 12 hours, in particular at least 18 hours. Thus in a preferred embodiment of the growth method, the growth substrate has a volume at least 1500 $cm^3$, and the product contains the defined binder but does not contain wetting agent. In another preferred embodiment of the growth method, the growth substrate is wetted prior to positioning of the plant in the growth substrate for growth, and the wetting takes place over a period of at least 12 hours, and the product contains the defined binder but does not contain wetting agent.

The mineral fibres employed may be any man-made vitreous fibres (MMVF), such as glass fibres, ceramic fibres, basalt fibres, slag wool, stone wool and others, but are usually stone wool fibres. Stone wool generally has a content of iron oxide at least 3% and content of alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general the product can be formed of any of the types of man-made vitreous fibre which are conventionally known for production of growth substrates.

Fibre diameter is often in the range of 3 to 20 microns, in particular 5 to 10 microns, as conventional.

The growth substrate is in the form of a coherent mass. That is, the growth substrate is generally a coherent matrix of mineral wool fibres, which has been produced as such, but can also be formed by granulating a slab of mineral wool and consolidating the granulated material.

Preferably the fibres are arranged predominantly in the vertical direction. This has the advantage of allowing better root growth than other orientations and enables the provision of a robust substrate which is useful during transplantation to the next stage.

The average density of the growth substrate is preferably 50-100 kg/m$^3$, preferably 60-95 kg/m$^3$, most preferably 70-90 kg/m$^3$.

The growth method of the invention is preferably a method of growing a plant from a seed, in particular a method of propagation, where the use of the products of the invention appears to be especially beneficial. In particular the method is beneficial in the case where seeds are introduced into seed holes in the substrate in an automated manner. It is found that the use of the binder system of the invention results in more efficient population of a large number of seed holes.

Positioning of the seed can be done in conventional manner. Accurate positioning is important and a preferred method is with the use of a seeder apparatus such as the Granette nozzle seeder (available from Visser).

The Granette seeder is a nozzle seeder with self-cleaning nozzles, which sows direct into the cell of the tray. Because of the many possible adjustments at the seeder in combination with the PSL-II index belt a very high accuracy is possible. The seeder has a double nozzle bar for sowing two rows of cells in a tray in one stroke. The vibrating nozzle bar will be positioned above the vibrating seed hopper, where the seeds will be picked up. By adjusting the time for picking up the seed, the amount of vacuum and the vibration intensity of the seed hopper and nozzle bar the desired result can be achieved. After picking up the seeds, the nozzle bar will be above the positioned tray, where the vacuum at the nozzles will be released so the seeds will drop into the centre of the cells of the tray. After dropping the seed, as the nozzle bar returns to the seed hopper, the nozzles are cleaned out by needles that come out of the nozzle-ends.

However, the method can alternatively be a method of propagation from a seedling or a method of growth to a later stage plant.

In a preferred embodiment it is a method of growth in which the substrate is a large-volume substrate, having volume at least 1500 cm$^3$, and in which the growth substrate includes the defined binder system but no wetting agent.

The invention includes a method of making a growth substrate product comprising the steps of:
(1) providing MMVF;
(2) spraying the MMVF with a binder composition;
(3) spraying the MMVF with a wetting agent;
collecting and consolidating the MMVF; and
curing the binder composition;
wherein the uncured binder composition comprises:
a sugar component, and
a reaction product of a polycarboxylic acid component and an alkanolamine component,
wherein the binder composition contains at least 42% by weight of the sugar component based on the total weight (dry matter) of the binder components.

Suitable fibre formation methods for step (i) and subsequent production steps for manufacturing the mineral fibre product are those conventional in the art. For instance the fibres are usually made by melting a mineral charge to form a mineral melt and fiberising the melt, by known means such as use of a cascade spinner (preferred) or use of internal centrifugation methods. This forms a cloud of airborne fibres.

Generally, the binder is sprayed, immediately after fiberisation of the mineral melt, on to the airborne mineral fibres. The aqueous binder composition is normally applied in an amount of 1.5 to 6%, preferably 2 to 5.5% by weight, of the bonded mineral fibre product on a dry basis. Binder content can be relatively high in the invention, for instance at least 3%, in particular at least 3.2%, and especially preferably at least 3.5% or at least 4%.

The wetting agent is also sprayed onto the airborne mineral fibres. Spraying of the binder composition and the wetting agent is often done substantially simultaneously but can be done sequentially. The wetting agent and binder can be pre-mixed before spraying but they are usually sprayed separately.

The spray-coated mineral fibre web is generally cured in a curing oven, usually by means of a hot air stream. The hot air stream may be introduced into the mineral fibre web from below, or above or from alternating directions in distinctive zones in the length direction of the curing oven. After curing, the cured binder composition binds the fibres to form a structurally coherent matrix of fibres.

The binder composition discussed above is defined by its content prior to curing. The curing may take place in accordance with a Maillard-type reaction route between two or more of the constituents of the binder composition. Preferably, there may be several reaction routes taking place during the curing. Typically, the curing oven is operated at a temperature of from about 150° C. to about 350° C. Preferably, the curing temperature ranges from about 200 to about 300° C. Generally, the curing oven residence time is from 30 seconds to 20 minutes, depending on, for instance, the product density.

If desired, the mineral wool web may be subjected to a shaping process before curing. The bonded mineral fibre product emerging from the curing oven may be cut to a desired format. Thus, the mineral fibre products produced may, for instance, have the form of plugs, blocks, mats, or slabs.

Often the product will be provided with a polymeric film wrapping before use as a growth substrate.

The Loss on Ignition (LOI) of the mineral fibre product is a measure of the amount of organic material such as binder and wetting agent in a mineral fibre product. The LOI of a dry sample may be measured using section 16 of BS2972, 1989 (Method 1). The LOI is preferably within the range 2.4-5.5%, preferably up to 5.3%, especially preferably 3.0-4.5%. The LOI of the mineral fibre product is preferably at least 3.2%, especially at least 3.5%, and can be at least 4%. The preferred LOI for a given product means that the product can be stronger, but with the binder of the invention we find that plant growth is not negatively affected despite the higher level of binder.

A higher LOI means the product is stronger. This means it is less likely to be damaged during use, especially during automated processing, for instance at a propagation facility. A further advantage of a higher binder content is that a smoother seed bed/hole can be formed in growth substrates such as plugs and blocks that are commonly provided with a seed hole. A smoother seed hole means that the seed is more likely to propagate from the ideal position in the seed bed/hole. The seed is additionally less likely to bounce out of the desired area, and/or be caught another part of the mineral fibre product. Accurate positioning of seeds leads to greater uniformity of the resulting crop which is advantageous for the propagator.

It will be appreciated by the skilled person that any of the preferred features of the invention may be combined in order to produce a preferred method, product, binder composition or use of the invention.

The following Examples are intended to further illustrate the invention.

EXAMPLES

The following methods were used to establish the water retention and the re-saturation of a sample.

Water Retention

The principle is described in EP-A-310501. In principle, the samples are saturated with water and are then put on a sand bed. Using as a reference the middle of the sample, the sample is then put via the sand bed on an underpressure of 10 cm water column. After 4 hours, the sample is taken from the sand bed and weighed. On basis of the measured dry and wet weight and the measured dimensions of the sample, the water content on a volume basis is calculated.

Re-Saturation

Samples are saturated with water and then drained until the samples have a total water content of 50% + or −2%. Then the samples are placed in a container in which the height of the water is 5 mm. after 4 hours the samples are taken out of the container and weighed. The weight after 4 hours is measured and this result together with the dimensions of the sample gives a water content on a volume basis after 4 hours. This is then a measure for the re-saturation capacity.

Preparation of Binder Component Resin (b)

158 g of diethanolamine (DEA) are placed in a 1-liter glass reactor provided with a stirrer and a heating/cooling jacket. The temperature of the diethanolamine is raised to 60° C. whereafter 91g of tetrahydrophthalic anhydride (THPA) are added. After raising the temperature and keeping it at 130° C., a second portion of 46 g of tetrahyrophthalic anhydride is added followed by 86 g of trimellitic anhydride (TMA). after reacting at 130° C. for 1 hour. After cooling to ambient temperature, the obtained resin is ready for use.

The solids content of the binder was measured as 58%.

Larger amounts of the binder component resin (b) were prepared for the binder copositions following the above producer.

Preparation of Binder Composition 3000 liter binder composition was prepared by first mixing 515 liter resin (b) binder component with 141 liter Ammonia, 22 liter hypophosphorous acid and 9.2 liter standard silane (gramma-aminoprpyltriethoxysilane). Afterwards, this mixture was mixed with 601 liters sugar component (a), Sirodex 431 from Syral.

Finally, this binder mixture was diluted with water to 22% solids and further diluted before use.

Larger amounts of the binder composition can be prepared for the production of the growth substrates by following the above procedure.

Preparation of Wetting Agent (c)

Linear alkyl benzene sulphonate anionic surfactant and monoethylene glycol were mixed in a 1.25:1 ratio to produce wetting agent (c) (LAS/MEG).

Preparation of Products of the Invention (Hereinafter Product 1)

The binder composition was prepared as described above. This binder composition (at an appropriate rate so as to achieve the quoted LOl values) and the prepared wetting agent (at a rate of 5.71 wetting agent/ton mineral wool) were fed into a cascade spinner and sprayed onto mineral fibres. The coated fibres were then collected on transport conveyors and transported to a curing oven for curing at 275 ° C. for 5 to 15 minutes to form a mineral fibre product. This product was then cut into plugs or blocks of the desired shape and seed holes were drilled as required.

Example 1

Eight block products were tested using the method above to establish the water retention and re-saturation levels. Products 1A to 1E are Product 1 and were according to the invention and product 1 F was a reference sample including phenol urea formaldehyde (PUF) binder. All blocks had a density of 75 kg/m³.

| | Block 10 cm × 10 cm × 6.5 cm | | | | | |
|---|---|---|---|---|---|---|
| Product | 1A | 1B | 1C | 1D | 1E | 1F |
| LOI (%) | 3.2 | 3.2 | 2.2 | 3.5 | 3.2 | 2.6 |
| WC-10 | 83.0 | 84.0 | 83.0 | 81.0 | 80.0 | 71.0 |
| Re-Saturation | 79.0 | 76.0 | 76.0 | 79.0 | 79.0 | 75.0 |

As indicated above, the WC-10 (measure of water retention) and re-saturation values were higher for the products of the invention, that is products 1A to 1E, than they are for the reference sample. This indicates that the product of the invention has a higher re-saturation value and a higher water retention value. These properties are advantageous for growing plants, since they mean that in the case of the WC-10 value that the grower does not need to water the plants so often, as the product will retain more water. It also means that due to the higher re-saturation value, it will be easier for the products to suck up water if the WC value decreases too far.

Example 2

In Example 2 there are four products tested which were plugs of 20 mm diameter and 25 mm height. Plug samples 2A, 2B and 2C were Product 1 and are of the invention and sample 2D is a reference case including PUF binder. As was shown above with the blocks, the WC-10 and re-saturation values are higher in the product of the invention than they are in the reference sample. All plugs had a density of 80 kg/m³.

|  | Plug trials | | | |
|---|---|---|---|---|
| Product | 2A | 2B | 2C | 2D |
| LOI (%) | 4.3 | 4.5 | 4.8 | 3.1 |
| WC-10 | 85.0 | 86.0 | 84.0 | 73.5 |
| Re-Saturation | 79.0 | 79.0 | 79.0 | 71.9 |

Example 3

The percentage of useable transplants for a Viper (Enza) crop was compared in three different plug types. These were: 3A, a stone wool fibre product with a phenol-urea formaldehyde (PUF) binder and a non-ionic surfactant wetting agent; 3B, which was Product 1; and 3C, a stone wool fibre product with a PUF binder and LAS/MEG wetting agent. All the plugs had a density of 80 kg/m³.

Please see the table below in which X indicates that there was an empty spot, that is the seed was not present in the plug, O indicates that the plant was not useable and UT represents useable transplants. The criteria used to establish the number in each category was determined by selection machine.

|  | 3A | | | 3B | | | 3C | | |
|---|---|---|---|---|---|---|---|---|---|
| Tray nr | X | O | UT | X | O | US | X | O | UT |
| 1 | 5 | 25 | 210 | 2 | 28 | 210 | 8 | 36 | 196 |
| 2 | 5 | 18 | 217 | 7 | 24 | 209 | 7 | 31 | 202 |
| 3 | 1 | 34 | 205 | 2 | 23 | 215 | 3 | 32 | 205 |
| 4 | 6 | 45 | 189 | 3 | 23 | 214 | 6 | 26 | 208 |
| 5 | 7 | 26 | 207 | 7 | 25 | 208 | 5 | 33 | 202 |
| 6 | 7 | 27 | 206 | 5 | 21 | 214 | 8 | 27 | 205 |
| 7 | 5 | 19 | 216 | | | | 8 | 36 | 196 |
| 8 | 8 | 22 | 210 | | | | 6 | 19 | 215 |
| 9 | 5 | 31 | 204 | | | | 3 | 31 | 206 |
| 10 | 3 | 29 | 208 | | | | | | |
| Average | 5.2 | 27.6 | 207.2 | 4.3 | 24.0 | 211.7 | 6.0 | 30.1 | 203.9 |
| Stdev | 2.0 | 7.9 | 7.7 | 2.3 | 2.4 | 3.0 | 2.0 | 5.4 | 5.9 |
| % | 2.2 | 11.5 | 86.3 | 1.8 | 10 | 88.2 | 2.5 | 12.5 | 85.0 |

As is shown, the average number of useable transplants in the present invention, that is in 3B, is 88.2, which is higher than the Reference Examples 3A and the 3C which are 86.3 and 85.0 respectively. This improvement on the percentage of useable transplants shows one of the advantages of the present invention. The mineral growth substrate of the present invention resulted in more useable transplants and reduced both the number of empty spots and the number of not useable transplants.

Example 4

In this Example, seeds of Maxifort were sowed in April and selection was carried out 12 days later. The selection was carried out by a selection machine with the following pixels determined to arrive at the different classes A to E.

| Class | Pixels > |
|---|---|
| A | 2000 |
| B | 1400 |

| Class | Pixels > |
|---|---|
| C | 800 |
| D | 450 |
| E | — |

Absolute number of plants through the vision system at selection machine

|  | A | B | C | D | E | Total | Lost |
|---|---|---|---|---|---|---|---|
| 4A | 186 | 330 | 284 | 66 | 124 | 990 | 18 |
| 4B | 135 | 300 | 310 | 78 | 160 | 983 | 25 |
| 4C | 303 | 290 | 205 | 62 | 135 | 995 | 13 |
| 4D | 305 | 267 | 218 | 48 | 140 | 978 | 30 |

% of plants per class at selection machine

|  | Class A | B | C | D | E |
|---|---|---|---|---|---|
| 4A | 19 | 33 | 29 | 7 | 13 |
| 4B | 14 | 31 | 32 | 8 | 16 |
| 4C | 30 | 29 | 21 | 6 | 14 |
| 4D | 31 | 27 | 22 | 5 | 14 |

Examples 4A and 4B were reference samples. 4A was a stone wool fibre product with a PUF binder and Rewopal wetting agent, 4B was a stone wool fibre product with a non-ionic surfactant. Examples 4C and 4D were Product 1. 4C has a LOI of 4.5%. 4D had a LOI of 3.0%. As shown above, in the present invention Examples 4C and 4D have more plants in Class A than the reference samples. Examples 4C and 4D each also have more plants in Classes A and B combined than Examples 4A and 4B. This shows the great improvement of the plug of the present invention.

Qualitatively class A is the best quality of plants that can be used immediately for sales or for further use in blocks or for grafting.

Class B are put back for 1 to 2 days to grow more and to get into Class A.

Class C are put back for more days, that is more than 2 days, to grow more and to get into Class A.

Class D in most cases are small plants which are waste and require too much further input to get into Class A.

Class E: in these cases the seeds did not germinate or the plant died.

Lost: in these cases there was no seed present.

Example 5

This Example is to show the seeding of the plugs in a standard 240 tray. Sowing was performed by a standard sowing machine. 5A was a stone wool fibre product with a PUF binder and Rewopal wetting agent. 5B was a stone wool fibre product with a non-ionic surfactant. 5C and 5D were Product 1. 5C had a LOI of 4.5%. 5D had a LOI of 3.0%. The results are shown in the table below.

|  |  | Missing Seeds | Badly Positioned Seeds | Total Missing Seeds & Badly Positioned Seeds |
|---|---|---|---|---|
| 5A | 1 | 0 | 0 | 0 |
|  | 2 | 0 | 0 | 0 |
|  | 3 | 0 | 1 | 1 |
|  | 4 | No data available | No data available | No data available |
|  | 5 | 1 | 2 | 3 |

| | | Missing Seeds | Badly Positioned Seeds | Total Missing Seeds & Badly Positioned Seeds |
|---|---|---|---|---|
| | Av | 0.25 | 0.75 | 1 |
| | Sd | 1 | 1.0 | 1 |
| 5B | 1 | 0 | 2 | 2 |
| | 2 | 0 | 3 | 3 |
| | 3 | 0 | 8 | 8 |
| | 4 | 0 | 1 | 1 |
| | 5 | 1 | 1 | 2 |
| | Av | 0.2 | 3 | 3.2 |
| | Sd | 0 | 3 | 3 |
| 5C | 1 | 1 | 1 | 2 |
| | 2 | 0 | 1 | 1 |
| | 3 | 0 | 0 | 0 |
| | 4 | 1 | 0 | 1 |
| | 5 | 0 | 0 | 0 |
| | Av | 0.4 | 0.4 | 0.8 |
| | sd | 1 | 0.5 | 1 |
| 5D | 1 | 1 | 1 | 2 |
| | 2 | 2 | 0 | 2 |
| | 3 | 1 | 0 | 1 |
| | 4 | 0 | 1 | 1 |
| | 5 | 0 | 1 | 1 |
| | Av | 0.8 | 0.6 | 1.4 |
| | sd | 1 | 0.5 | 1 |

As indicated in the data above, the mineral wool product of the invention leads to improved seeding compared to the reference examples. In particular, 5C and 5D had an average total missing seeds and badly positioned seeds of 0.8 and 1.4 respectively. This compares to the 3 and the 3.2 of the 5A and 5B respectively. 5B in particular had lots of seeds in between the plugs and seeds on top of the plug. The seeding performance of 4C and 4D is better than the reference samples.

Example 6

In this example, 6A shows the compression stiffness of a plug of Product 1 versus a plug made using a reference sample 6B. As shown, 6A has the same LOI as 6B, and the plugs of the invention have a greater compression strength than the reference sample 6B.

6C and 6D are blocks made using Product 1. These show a higher compression strength than 6E, the reference sample, for the same LOI. 6B and 6E were each a stone wool fibre product with a PUF binder.

In this example all products were semi finished products (SFP), which is the mineral wool before it is formed into the end product—this means it is possible to determine compression strength, which cannot be done on end-product plugs. SFP plugs have dimensions 100 mm (length)×152 mm (height)×67 mm (width), density 80 kg/m3. SFP blocks have dimensions 100 mm (length)×106 mm (height)×67 mm (width), density 75 kg/m3. Compression strength values are measured by Zwick apparatus.

A higher compression strength means that the product is less likely to be damaged during use. A further advantage of a stronger product is that a smoother seed bed/hole can be formed. A smoother seed hole means that the seed is more likely to propagate from the ideal position in the seed bed/hole. The seed is additionally less likely to bounce out of the desired area, and/or be caught another part of the mineral fibre product. Accurate positioning of seeds leads to greater uniformity of the resulting crop which is advantageous for the propagator.

| Overview compression stiffness trials plugs and blocks. | | |
|---|---|---|
| | LOI (%) | Compression Strength (N/cm2) SFP |
| Plugs SFP | | |
| 6A | 3.2 | 262 |
| 6B | 3.2 | 208 |
| Blocks SFP | | |
| 6C | 2.4 | 200 |
| 6D | 2.4 | 183 |
| 6E | 2.4 | 176 |

The invention claimed is:

1. A method of growing plants in a mineral wool growth substrate, the method comprising:
   providing at least one mineral wool growth substrate comprising man-made vitreous fibres bonded with a cured binder composition, and
   positioning one or more seeds or plants for growth in the at least one mineral wool growth substrate, and allowing growth of the one or more seeds or plants,
   wherein the cured binder composition comprises the following initially uncured binder components:
   a) at least 45% by weight of a sugar component based on the total weight (dry matter) of the initially uncured binder components, and
   b) a reaction product of a polycarboxylic acid component and an alkanolamine component,
   wherein the at least one mineral wool growth substrate further comprises a wetting agent;
   and wherein the sugar component is a reducing sugar having a dextrose equivalent (DE) of 40 to 100.

2. The method according to claim 1, wherein the wetting agent comprises an ionic surfactant.

3. The method according to claim 1, wherein the wetting agent comprises an anionic surfactant.

4. The method according to claim 3, wherein the anionic surfactant comprises linear alkyl benzene sulphonate anionic surfactant.

5. The method according to claim 1, wherein the sugar component comprises a reducing sugar.

6. The method according to claim 1, wherein the polycarboxylic acid component comprises a carboxylic anhydride.

7. The method according to claim 6, wherein the carboxylic anhydride component comprises a combination of a cycloaliphatic anhydride and an aromatic anhydride.

8. The method according to claim 1, wherein the sugar component is a reducing sugar having a DE of 50 to 100.

* * * * *